United States Patent
Darden et al.

(10) Patent No.: US 11,568,350 B2
(45) Date of Patent: Jan. 31, 2023

(54) RETAIL USER INTERFACE FOR DYNAMIC BEHAVIOR CONFIGURATION

(71) Applicant: Toshiba Global Commerce Solutions Holdings Corporation, Tokyo (JP)

(72) Inventors: Zachary McCain Darden, New Hill, NC (US); Jonathan Waite, Cary, NC (US); Andrei Khaitas, McKinney, TX (US); Andrew Norris, Durham, NC (US); Valentine Mourzenok, Chapel Hill, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 17/038,764

(22) Filed: Sep. 30, 2020

(65) Prior Publication Data

US 2022/0101223 A1 Mar. 31, 2022

(51) Int. Cl.
*G06Q 10/00* (2012.01)
*G06Q 10/06* (2012.01)
*G06Q 20/20* (2012.01)

(52) U.S. Cl.
CPC ....... *G06Q 10/0637* (2013.01); *G06Q 20/202* (2013.01)

(58) Field of Classification Search
None
See application file for complete search history.

(56) References Cited

U.S. PATENT DOCUMENTS

| | | | |
|---|---|---|---|
| 8,230,390 B2 | 7/2012 | Koster | |
| 8,271,541 B2 | 9/2012 | Mohan et al. | |
| 10,237,138 B2 | 3/2019 | Xie et al. | |
| 2002/0120917 A1 | 8/2002 | Abrari et al. | |
| 2002/0147726 A1 | 10/2002 | Yehia et al. | |
| 2003/0110073 A1* | 6/2003 | Briel | G06Q 30/0641 705/27.1 |
| 2005/0060317 A1 | 3/2005 | Lott et al. | |
| 2005/0171853 A1* | 8/2005 | Fettig | G06Q 20/20 705/30 |

(Continued)

FOREIGN PATENT DOCUMENTS

EP 0808545 B1 1/2006

OTHER PUBLICATIONS

PCI DSS Quick Reference Guide, Jul. 2018, PCI Data, https://listings.pcisecuritystandards.org/documents/PCI_DSS-QRG-v3_2_1.pdf, p. 1-39. (Year: 2018).*

(Continued)

*Primary Examiner* — Joseph M Waesco
(74) *Attorney, Agent, or Firm* — Coats & Bennett, PLLC (57) ABSTRACT

The disclosure provides a method of generating business rules for a retail system. Particularly, a computing device receives rule data from a user interface. The rule data comprises retail context information associated with a retail business operating the retail system. A business rule template is then generated based on the retail context information included in the rule data, and validated based on the retail context information and on sample business data. Validation may occur by conditionally performing one or more Point of Sale (POS) functions on the sample business data according to the retail context information. If valid, the business rule template is activated for use in the retail system.

19 Claims, 5 Drawing Sheets

(56) References Cited

U.S. PATENT DOCUMENTS

| | | | |
|---|---|---|---|
| 2005/0262189 A1 | 11/2005 | Mamou et al. | |
| 2005/0262190 A1* | 11/2005 | Mamou | G06Q 10/10 |
| | | | 709/203 |
| 2011/0077999 A1* | 3/2011 | Becker | G06Q 10/10 |
| | | | 705/14.1 |
| 2013/0097664 A1* | 4/2013 | Herz | G06F 16/337 |
| | | | 726/1 |
| 2014/0188655 A1* | 7/2014 | Johnson | G06Q 30/0641 |
| | | | 705/26.5 |
| 2014/0297335 A1* | 10/2014 | Wargin | G06Q 40/08 |
| | | | 705/4 |
| 2018/0025334 A1* | 1/2018 | Pourfallah | G06Q 20/3223 |
| | | | 705/41 |
| 2018/0131765 A1* | 5/2018 | Puleston | H04L 67/1097 |
| 2018/0341505 A1* | 11/2018 | Ebersohn | G06Q 20/202 |
| 2019/0147708 A1* | 5/2019 | Monaco | G06Q 20/065 |
| | | | 705/16 |
| 2019/0205915 A1* | 7/2019 | Hunter | G06Q 30/0229 |
| 2019/0251590 A1* | 8/2019 | Bodington | G06Q 30/02 |
| 2019/0295054 A1* | 9/2019 | Purves | G06Q 20/28 |
| 2020/0219136 A1* | 7/2020 | Stoyles | G06Q 30/0257 |
| 2020/0364525 A1* | 11/2020 | Mats | H04W 4/70 |
| 2021/0352144 A1* | 11/2021 | Puleston | H04L 67/1097 |

OTHER PUBLICATIONS

Trustradius, "Business Rules Management Systems (BRMS)", Jan. 1, 2020, pp. 1-9, retrieved on Sep. 22, 2020, retrieved from internet: https://www.trustradius.com/business-rules-management-brms.

Inrule, "Decision Platform Overview", Jan. 1, 2020, pp. 1-2, retrieved on Sep. 22, 2020, retrieved from internet: https://www.inrule.com/inrule/.

Sparklinglogic, "Smarts Decision Manager", Jan. 1, 2020, pp. 1-5, retrieved on Sep. 22, 2020, retrieved from internet: https://www.sparklinglogic.com/smarts-decision-manager/.

Decisions, "Decisions Workflow Software and Rule Engine Platform", Jan. 1, 2020, retrieved on Sep. 22, 2020, retrieved from internet: https://decisions.com/.

\* cited by examiner

FIG. 5 ized retail systems, and more particularly, to the generation and deployment of context-aware business rules that drive the retail-oriented behavior of such systems.

RETAIL USER INTERFACE FOR DYNAMIC BEHAVIOR CONFIGURATION

TECHNICAL FIELD

The present disclosure relates generally to computerized retail systems, and more particularly, to the generation and deployment of context-aware business rules that drive the retail-oriented behavior of such systems.

BACKGROUND

Many conventional retail systems operate according to a set of context-aware business rules. Such rules can, for example, set prices, impose thresholds on quantity, and define the relationships between different products and/or prices. When a customer purchases a product, these rules are checked to ensure the purchase is correct.

In most cases, the rules are specific to the retail business implementing them. Nevertheless, the rules are generally hardcoded into the software used by the retail businesses. As the rules tend to change from time-to-time, it is difficult for retailers to quickly and easily update their retail systems to reflect new rules. Further, the rules usually require knowledge regarding the product and/or retail industry in which the retail system operates. As such, articulating business rules for use in a retail system is not always an easy, straightforward task.

DETAILED DESCRIPTION

Embodiments of the present disclosure provide a method and corresponding computing device configured to generate context-aware business rules that drive the behavior of a retail system of a retail business. In addition, embodiments of the present disclosure are configured to validate the rules to ensure that the retail system will operate as planned before activating the rules in a production environment. To accomplish these goals, the present embodiments provide an operator of the retail system with a graphical user interface (GUI) that allows the operator to dynamically create new rules, modify existing rules, and delete obsolete rules without having to change application code. Thus, the present embodiments negate the conventional need for the business rules to be hardcoded into the application code of the retail system.

Figure 1:
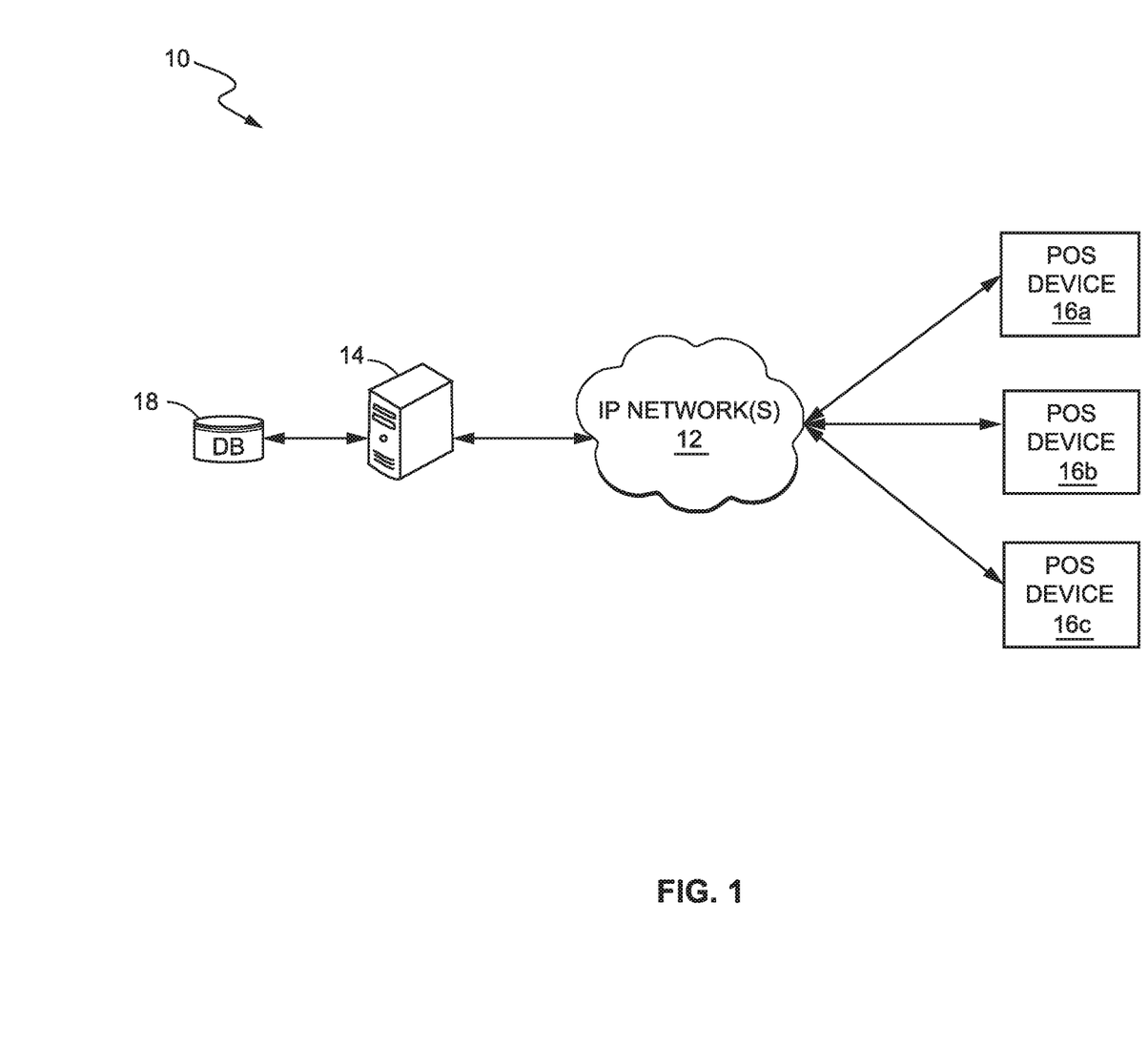
FIG. 1 is a functional block diagram illustrating a retail system configured according to an embodiment of the present disclosure.

Referring now to the drawings, FIG. 1 illustrates a retail system 10 configured according to embodiments of the present disclosure. In particular, retail system 10 is associated with a retail business (e.g., WALMART, HOME DEPOT, TARGET, restaurants, etc.), and functions to provide Point-of-Service (POS) solutions to such businesses. Such POS functions include, but are not limited to, customer checkout, return processing, coupon processing, sale It should be noted that FIG. 1 illustrates only some of the components that may comprise a retail system 10, and those of ordinary skill in the art should readily appreciate that retail system 10 may comprise other components that are not specifically seen in the figure.

As seen in FIG. 1, retail system 10 comprises an IP network 12 communicatively connecting an application server (AS) 14 with one or more Point-of-Sale (POS) devices 16*a*, 16*b*, 16*c* (collectively herein, "POS devices 16"). A database (DB) 18 or other mass storage device is also connected to AS 14 and is configured to store the rules generated for, and utilized by, retail system 10.

The IP network 12 comprises one or more public and/or private data networks that use Internet Protocol (IP) to communicate data packets between components. Such networks are well-known in the art and include networks that are globally accessible by users (e.g., the Internet), as well as Local Area Networks (LANs), Wide Area Networks (WANs), and enterprise networks. In some cases, IP network 12 may comprise one or more wireline networks (e.g., ETHERNET). In other cases, however, IP network 12 may comprise one or more wireless networks in addition to, or in lieu of, one or more wireline networks.

The AS 14 comprises a computer server accessible by the POS devices 16 via IP network 12. As described in more detail later, AS 14 provides a GUI to the operator on a display device. In some embodiments, the display device is connected directly to AS 14, while in other embodiments, the display device is connected to AS 14 via one or more other devices and/or IP network 12. In these latter cases, retail system may additionally comprise a provisioning computer (not shown) with which the operator can interact. More particularly, as described in more detail later, the operator uses the GUI to input data related to the context-aware business rules. That information is then used to generate a business rule template, which AS 14 validates based on a set of sample data (e.g., data stored in DB 18) and information related to the context in which the business rule template will be invoked. Provided the business rule template is deemed valid, AS 14 activates the business rule template for use by client applications executing on the POS devices 16. In some embodiments, AS 14 will also store the validated business rule template in DB 18.

Figure 2:
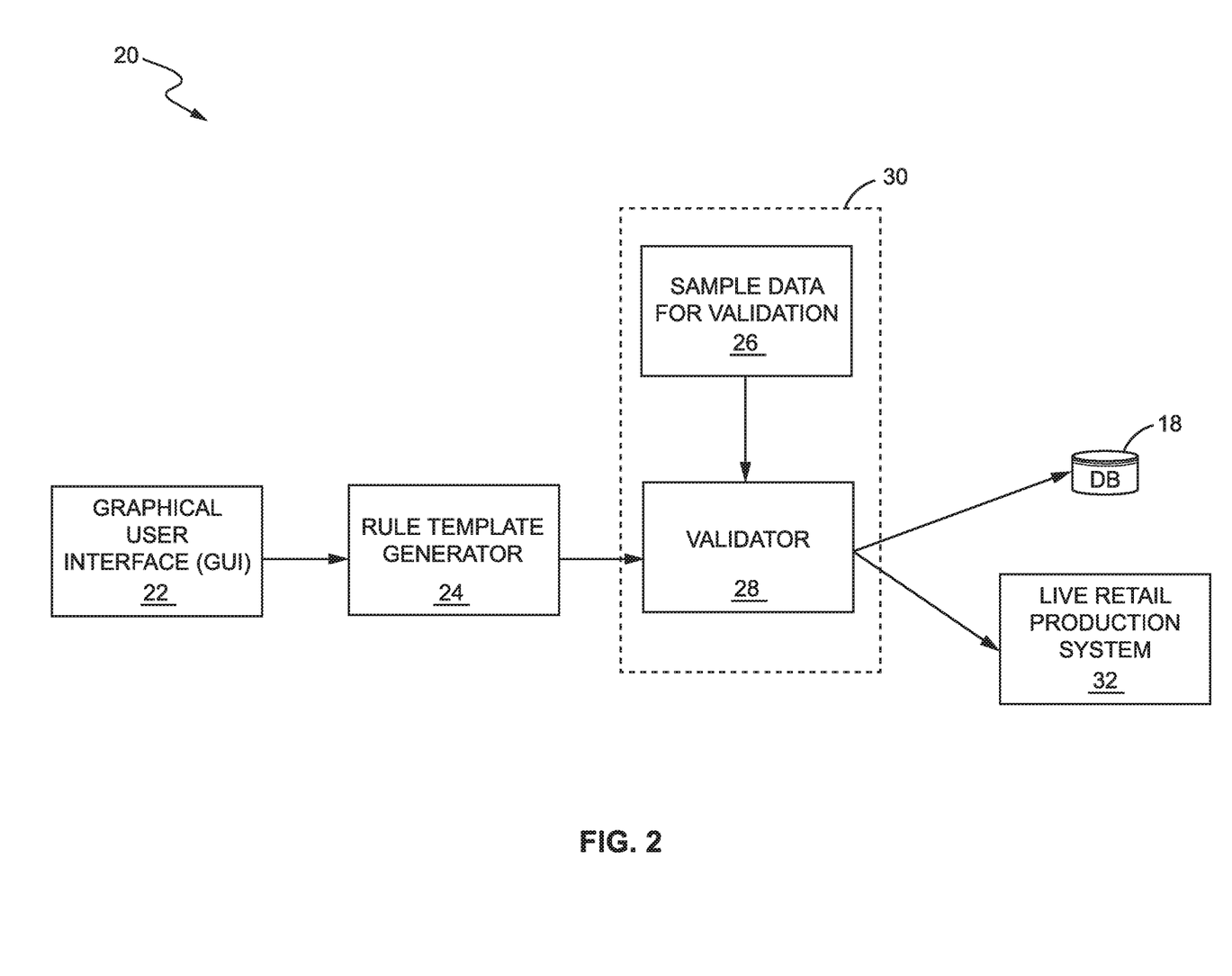
FIG. 2 is a block diagram illustrating a functional flow for generating a business rule template according to an embodiment of the present disclosure.

FIG. 2 is a block diagram illustrating a functional flow 20 for generating a business rule template according to an embodiment of the present disclosure. As seen in the embodiment of FIG. 2, functional flow 20 comprises a GUI function (i.e., GUI 22), a rule generator function (i.e., rule template generator 24), and a validation function (i.e., validator 28).

In operation, the operator inputs rule data into a computer via GUI 22. Such computers may, for example, be a network-based application server such as AS 14. In such cases, GUI 22 could execute directly on AS 14 but be provided via network 12 to a device associated with the user (e.g., a laptop or notebook computer, a desktop computer, a mobile device, a POS device, etc.). Alternatively, GUI 22 may execute on one of those devices. For example, in one embodiment, GUI 22 is executed on a provisioning computer (not shown) associated with the retail business. Particularly, the operator enters the rule data into GUI 22, which then sends the rule data to AS 14 via network 12 for further processing.

The rule data comprises retail context information associated with the retail business operating retail system 10. In general, the retail context information provides the context under which the rules defined in the business rule template will operate. For example, in one embodiment, the retail context information comprises a user ID identifying a user (e.g., an employee or manager) that will use the retail system 10. In another embodiment, the retail context information comprises a store ID that identifies a particular store or retail business that is subject to the rule. In some embodiments, the retail context information comprises one or more constraints that are applied by a particular business rule. By way of example only, a constraint may be one or both of a date-based constraint and a time-based constraint indicating when a particular retail action is permitted (or not permitted) to occur. Such constraints may define a date and/or a time range during which a particular item is on sale, or they may define a particular day and/or time after which a product can no longer be returned.

Other constraints are also possible, and in some embodiments, may be used in conjunction with other constraints and/or retail context information to define more complex rules. For example, consider a business rule that defines a simple process for returning a purchased item (e.g., a customer can simply return a purchased product for a cash refund). According to the present disclosure, this rule can be enhanced to limit the amount of time a customer has to return a product. For example, an operator creating the rule could add date/time constraints to define a particular day and/or time after which a customer can no longer return the product. Additionally, the operator could add different retail context information, such as a store ID and/or a user ID, to limit where the product can be returned and/or the particular operator or type of operator (e.g., a store manager) who is permitted to process the return.

Further, when using GUI 22 to create the rule data, the operator can select which particular products or types of products that a given rule, along with the corresponding constraints and/or retail context information, will apply to. Thus, in accordance with the present disclosure, an operator can create the same rule or type of rule for a variety of different products and/or class(es) of products (e.g., a rule defining a return process), with one or more of the products and/or class(es) of products defining different constraints and/or retail context information.

Regardless of the computer that presents the GUI 22 to the operator, and regardless of the specific retail context information and/or constraints entered by the operator, GUI 22 sends the rule data to the rule template generator 24 for further processing.

Upon receiving the rule data, the rule template generator 24 generates a corresponding business rules template. Particularly, in one embodiment, the rule template generator 24 is a rules engine configured to generate the business rule template using the rule data received from GUI 22. In operation, the rule template generator 24 creates the business rule template to include decision logic. This logic is used by the live retail system 10 to implement the particular business rule. By way of example only, the decision logic may comprise one or more conditional logic statements (e.g., IF-THEN and/or IF-THEN-ELSE constructs) that define which particular POS actions (e.g., returns, manager override, validations, etc.) will occur within the retail system 10, as well as when those actions can occur, and who can perform the POS actions in accordance with the constraints and/or retail context data. In one embodiment, for example, the rule template generator 24 comprises a Business Rule Management System (BRMS) such as "DROOLS."

The rule template generator then outputs the business rules template for validation to validator 28. Particularly, in some cases, validator 28 may be configured to initially check the syntax of the decision logic, as well as the viability of the constraints and/or retail context information included in the business rules template. For example, these simple checks can quickly identify whether a constraint intended to indicate a future date and/or time has already passed, making the constraint invalid. As another example, validator 28 may check to determine whether a store ID or user ID included in the business rule template is valid within the retail system 10. If not, validation fails and the operator would be informed as to failure. However, in some embodiments, such initial checks are performed by GUI 22 and/or rule template generator 24. In these cases, the business rule template generated by the rule template generator 24 would be considered at least initially valid, and thus, validator 26 would not need to perform the initial validation checks.

Regardless of which function performs the initial checks, however, validator 28 will then validate the business rule template based on the retail context information included in the business rule template using sample data 26, such as sample JavaScript Object Notation (JSON) data. In particular, validator 28 will conditionally perform one or more POS actions on the sample data 26 according to the retail context information. Such POS actions include, but are not limited to, retail business functions such as:

a manager override process. For example, when a manager must override the price printed on the label of a product or override a given constraint;
 a product return process;
 a process that conditionally collects information about a product being purchased. For example, a process to request certain information from a customer may be triggered based on whether the item being purchased by the customer is/is not taxable. In another example, the process may be triggered based on whether a customer eats the food he/she ordered in the restaurant (i.e., dine-in) or whether the order is a to-go order. In general, this process may be triggered to gather customer information based on any condition(s) needed or desired;
 a validation process. For example, a process that will validate customer loyalty information and offer special discounts or other benefits unique to that customer; and
 an enforcement process configured to enforce one or more limitations associated with processes performed as part of the POS actions. For example, a process that will enforce constraints or limitations other than those specified in the business rule template. Such constraints or limitations may include, for example, those that are specified by a corporate authority of the retail business and applied to all items sold by or returned to the retail business.

Figure 3:
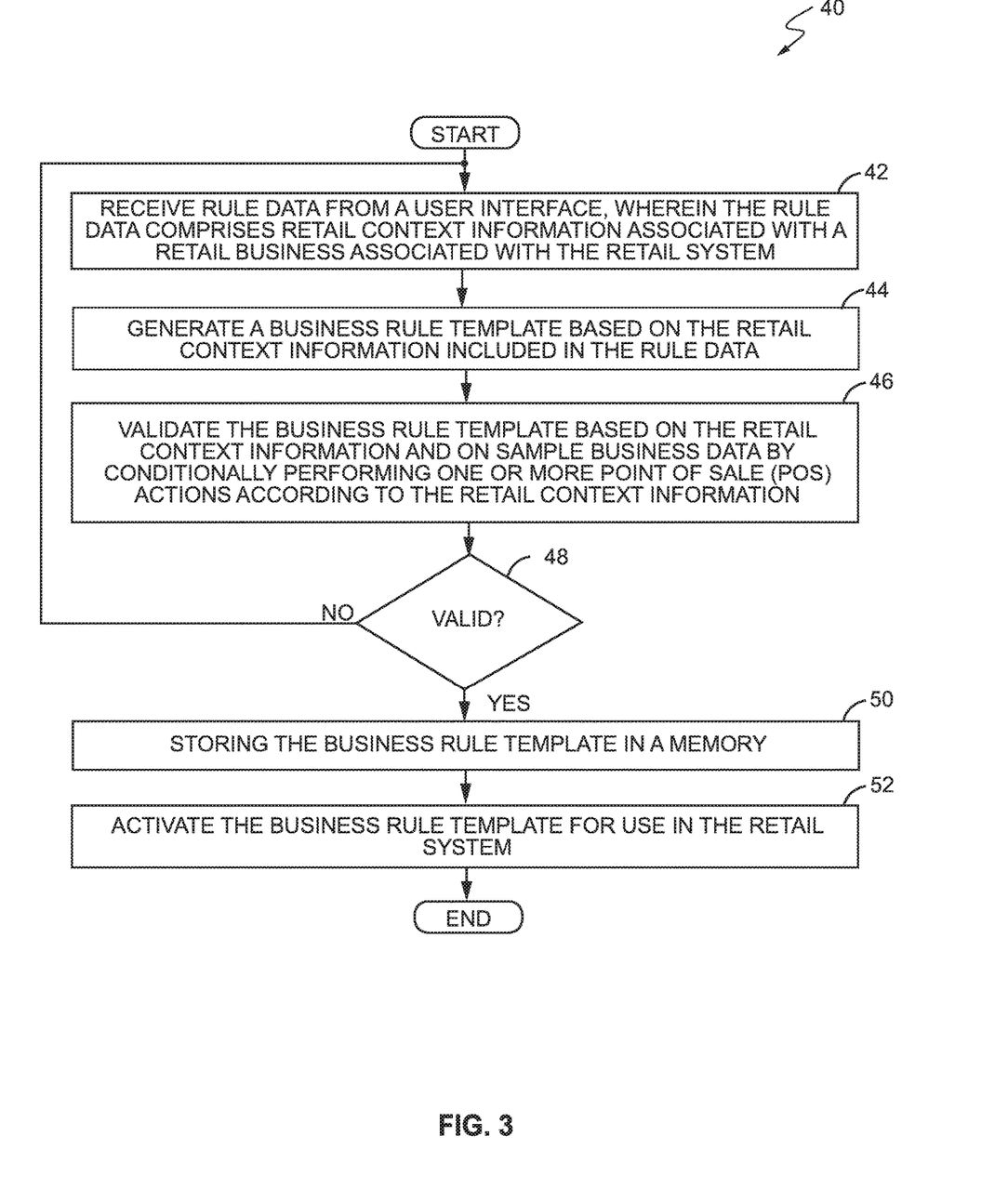
FIG. 3 is a flow diagram illustrating a method for generating a business rule template according to an embodiment of the present disclosure.

As seen in FIG. 3, validator 28 performs the validation process—including executing the POS actions—in a "sandbox" 30. The sandbox 30 is a stand-alone test environment that mimics the conditions of the live production system 32. Thus, validator 28 is able to fully test all aspects of the business rule template as if it were operating in the live retail production system 32 without having to actually operate in the live retail production system 32.

If validator 28 deems the business rule template to be valid, validator 28 is configured to activate the business rule template for use in the live retail production system 32. In some embodiments, validator 28 is also configured to store the business rule template in DB 18. In these latter cases, retail system 10 is able to retrieve the business rule template for later activation in the live retail production system 32.

However, if validator 28 does not deem the business rule template to be valid, validator 28 will return a failure signal to GUI 22, which is then displayed as a failure message to the operator. The failure signal may include an indication identifying the particular part of the business rule template that failed (e.g., the particular decision logic code and/or constraint/retail context information that failed), as well as a reason for the failure. In some embodiments, the failure signal may also trigger GUI 22 to display some helpful instructions or troubleshooting procedures for the operator to follow in order to correct the failure. So corrected, GUI 22 would send the updated rule data to the rule template generator 24 so that an updated business rule template could be generated and then validated by validator 28.

FIG. 3 is a flow diagram illustrating a method 40 for generating a business rule template according to an embodiment of the present disclosure. Method 40, which is implemented by a computer (e.g., AS 14), calls for receiving rule data from a user interface, such as GUI 22 (box 42). As stated above, the rule data comprises retail context information associated with a retail business associated with the retail system. Once received, method 40 calls for generating a business rule template based on the retail context information included in the rule data (box 44). Method 40 next calls for validating the business rule template based on the retail context information and on sample business data (box 46). In this embodiment, validating the business rule data comprises validator 28 conditionally performing one or more POS actions on the sample business data according to the retail context information If the business rule data cannot be validated (box 48), the process begins again with the operator providing corrected rule data to GUI 22 (box 42) and a new business rule template being generated from that updated rule data (box 44). This may continue until the business rule template is validated. Responsive to determining that the business rule template is valid (box 48), method 40 calls for storing the validated business rule template in a memory (box 50), such as DB 18, and also activating the business rule template for use in the retail system 10 (box 52).

In some embodiments of the present disclosure, the one or more POS actions comprise one or more of:
a manager override process;
a product return process;
a process that conditionally collects information about a product being purchased;
a validation process; and
an enforcement process configured to enforce one or more limitations associated with processes of the one or more POS actions.

In some embodiments, the process that conditionally collects information about a product being purchased is performed based on how the product is taxed. For example, the process may collect certain types or amounts of information from a user for products that are not subject to tax, and collect other types or amounts of information from a user for products that are taxed. In other embodiments, however, the process that conditionally collects information about a product being purchased is performed based on how a customer intends to consume the product, or where the consumer will use or consume the product. By way of example, the process may collect one or more types of information from a user who is eating the food he/she ordered in a dining area of a restaurant, but collect other types or amounts of information from a user who ordered food for take-out. Additionally, certain types or classifications of food and/or products can trigger the process to conditionally collect certain information about the food or product. For example, information may be collected from users who purchase a certain cut of steak or a certain type(s) of vegetables.

In some aspects, the retail context information identifies a constraint comprising one or both of a date-based constraint and a time-based constraint. At least one of the POS actions is performed according to the constraint.

In some embodiments, the retail context information comprises a user ID that identifies a user associated with the retail business. Additionally, the retail context information may comprise a store ID of the retail business. In some cases, the retail context information may comprise both the store ID and a user ID along with other information as needed or desired. For example, in some cases, the retail context information comprises a user permission set that defines the POS actions users associated with the retail business are permitted to perform.

Figure 4:
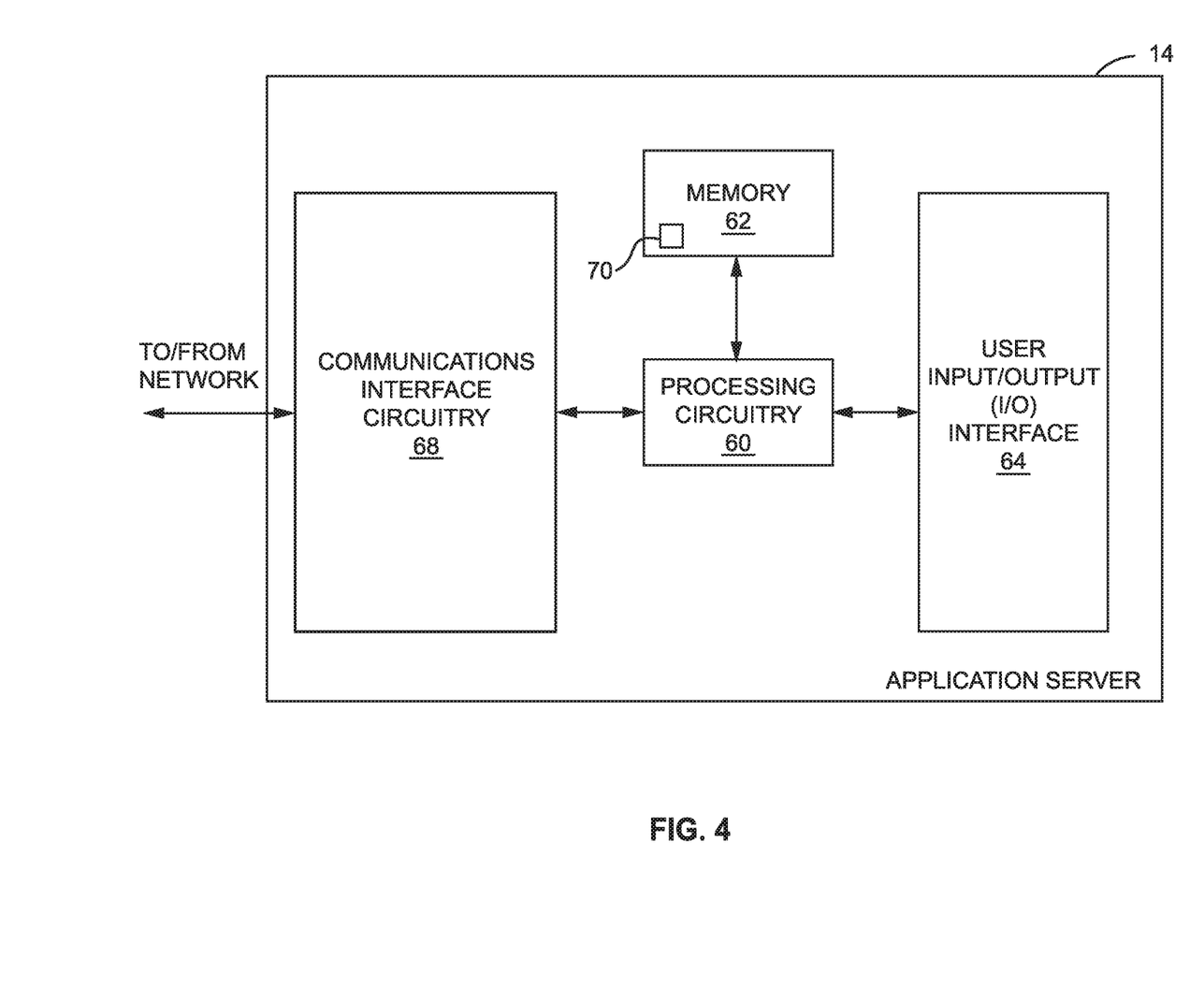
FIG. 4 is a functional block diagram illustrating some components of a computing device configured to generate a business rule template according to an embodiment of the present disclosure.

FIG. 4 is a functional block diagram illustrating some components of a computing device configured to generate a business rule template according to embodiments of the present disclosure. The computing device may, for example, be AS 14, and comprises processing circuitry 60, memory 62, a user input/output)I/O) interface 64, and communications circuitry 68.

Processing circuitry 60 comprises one or more microprocessors, hardware circuits, firmware or a combination thereof. In the exemplary embodiments described herein, processing circuitry 60 is configured to implement business rule generation in retail system 10, as previously described. Additionally, processing circuitry 60 is also configured to validate the generated business rule templates. If processing circuitry 60 determines that the generated business rule templates are valid, processing circuitry 60 is configured to activate the templates within the retail system 60, and in some situations, store the validated templates in DB 18, as previously described.

Memory 62 comprises a non-transitory computer readable medium that stores executable program code and data used by the processing circuitry 60 for operation. In this embodiment, the program code and data comprises a control program 70 that, when executed by processing circuitry 60, configures AS 14 to perform the functions previously described. In some embodiments, control program 70 has access to user profile information that, as previously described, can be utilized by the POS actions defined in the business rule template. Memory 62 may include both volatile and non-volatile memory, and may comprise random access memory (RAM), read-only memory (ROM), and electrically erasable programmable ROM (EEPROM) and/or flash memory. Additionally or alternatively, memory 62 may comprise discrete memory devices, or be integrated with one or more microprocessors in the processing circuitry 60.

The user I/O interface 64 comprises, in one or more embodiments, one or more input devices and display devices to enable a user, such as a store associate or operator, for example, to interact with and AS 14. Such devices may comprise any type of device for inputting data into a computing device including, but not limited to, keyboards, number pads, push buttons, touchpads, touchscreens, or voice activated inputs. The display devices that comprise user I/O interface 64 may, for example, be a liquid crystal display (LCD) or light emitting diode (LED) display. In some embodiments, the display device may comprise a touchscreen display that also functions as a user input device. Regardless, user I/O interface 64 is configured to display the GUI 22 to an operator of the retail system 10 so that the operator can input the rule data that AS 14 uses to generate the business rule templates. In some cases, the user I/O interface 64 is integrated with AS 14. In other cases, however, the user I/O interface 64 is implemented on another computing device (e.g., a provisioning computer and/or one or more POS devices 16) that sends data to, and receives data from, AS 14.

The communications interface circuitry 68 comprises, in one embodiment, a transceiver circuit and/or interface circuit for communicating with remote devices over a communication network or direct communication link. For example, the communications interface circuitry 68 may comprise a WiFi interface, a cellular radio interface, a BLUETOOTH interface, an Ethernet interface, or other similar interface for communicating over IP network 12 and/or a wireless communication link. AS 14 may use the communications interface circuitry 68, for example, to communicate with the components of another computing device (e.g., a provisioning computer and/or one or more POS devices 16), as previously described.

Figure 5:
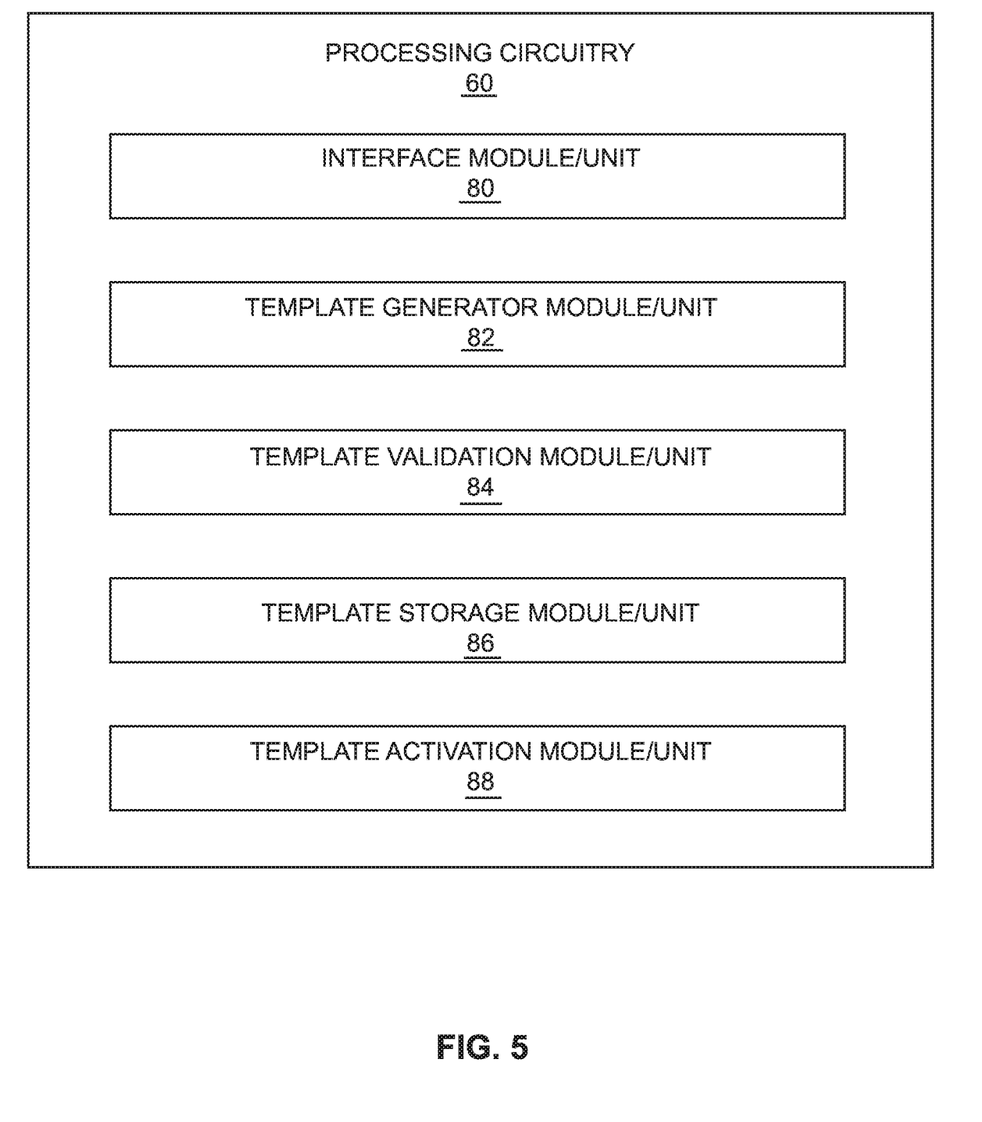
FIG. 5 is a schematic block diagram illustrating a computer program product configured to generate a business rule template according to an embodiment of the present disclosure.

FIG. 5 is a schematic block diagram illustrating a computer program product, such as control program 70, for example, configured to generate a business rule template according to an embodiment of the present disclosure. As stated above, control program 70 comprises executable code that, when executed by processing circuitry 60, causes AS 14 to generate, validate, and activate context-aware business rule templates, as previously described. As seen in FIG. 5, the control program 70 may be embodied in a non-transitory, computer-readable medium, such as the memory 62 of AS 14, or alternatively, in a removable memory device, such as a thumb drive or disc Control program 70 in this embodiment is executed on processing circuitry 60 and comprises an interface module/unit 80, template generator module/unit 82, a template validation module/unit 84, a template storage module unit 86, and a template activation module/unit 88.

The interface module/unit 80 comprises program code that is executed by processing circuitry 60 to receive rule data input into a GUI 22 by an operator. The template generator module/unit 82 comprises program code executed by processing circuitry 60 to generate the business rule templates from the received rule data. The template validation module/unit 84 comprises computer program code that, responsive to the business rule templates generated by the template generator module/unit 82, configures processing circuitry 60 to validate the business rule templates. The template storage module/unit 86 comprises computer program code that when executed by processing circuitry 60, stores validated business rule templates in DB 18, while the template activation module/unit 88 comprises program code that is executed by processing circuitry 60 to activate the generated business rule templates into retail system 10.

The present embodiments may, of course, be carried out in ways other than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

What is claimed is:

1. A method of generating business rules for a retail system, the method comprising:
  receiving rule data from a user interface, wherein the rule data comprises retail context information associated with a retail business associated with the retail system;
  generating a business rule template based on the retail context information included in the rule data, wherein the business rule template is generated to comprise:
    one or more business rules defining how a Point of Sale (POS) device in the retail system will function according to the retail context information;
    a constraint to be applied by at least one of the one or more business rules, wherein the constraint comprises one or both of a date-based constraint and a time-based constraint; and
    decision logic implementing the one or more business rules, wherein the decision logic comprises one or more conditional logic statements defining which of one or more POS actions the POS device will perform according to the date-based constraint and/or the time-based constraint;
  validating the business rule template based on the retail context information and on sample business data, wherein validating the business rule template comprises executing the decision logic in a non-production environment to selectively perform one or more POS actions on the sample business data according to the date-based constraint and/or the time-based constraint; and
  activating the business rule template for use in the retail system responsive to determining that the business rule template is valid, wherein activating the business rule template configures one or more client applications executing on the POS device to perform the one or more POS actions according to the decision logic in the business rule template and according to the date-based constraint and/or the time-based constraint.

2. The method of claim 1 wherein the one or more POS actions comprise one or more of:
  a manager override process;
  a product return process;
  a process that collects information about a product being purchased;
  a validation process; and
  an enforcement process configured to enforce one or more limitations associated with processes of the one or more POS actions.

3. The method of claim 2 wherein the process that collects information about a product being purchased is performed based on how the product is taxed.

4. The method of claim 2 wherein the process that collects information about a product being purchased is performed based on how a customer intends to consume the product.

5. The method of claim 1 wherein the retail context information comprises a user ID identifying a user associated with the retail business.

6. The method of claim 1 wherein the retail context information comprises a store ID of the retail business.

7. The method of claim 1 wherein the retail context information comprises a user permission set that defines the POS actions users associated with the retail business are permitted to perform.

8. The method of claim 1 further comprising storing the business rule template in a memory responsive to determining that the business rule template is valid.

9. The method of claim 1 wherein validating the business rule template further comprises:
verifying that a syntax of the decision logic comprised in the business rule template is valid;
verifying whether the constraint is valid; and
executing the decision logic in the non-production environment to selectively perform the one or more POS actions on the sample business data according to the constraint and the retail context information.

10. A network computing device for generating business rules for a retail system, the network computing device comprising:
communications interface circuitry configured to communicate with one or more Point-of-Sale (POS) devices in the retail system; and
processing circuitry operatively coupled to the communications interface circuitry and configured to:
receive rule data from a graphical user interface (GUI), wherein the rule data comprises retail context information for a retail business associated with the retail system;
generate a business rule template based on the retail context information included in the rule data, wherein the business rule template is generated to comprise:
one or more business rules defining how a Point of Sale (POS) device in the retail system will function according to the retail context information;
a constraint to be applied by at least one of the one or more business rules, wherein the constraint comprises one or both of a date-based constraint and a time-based constraint; and
decision logic implementing the one or more business rules, wherein the decision logic comprises one or more conditional logic statements defining which of one or more POS actions the POS device will perform according to the date-based constraint and/or the time-based constraint;
validate the business rule template based on the retail context information and on sample business data, wherein to validate the business rule template, the processing circuit is configured to execute the decision logic in a non-production environment to selectively perform one or more PoS actions according to the date-based constraint and/or the time-based constraint; and
activate the business rule template for use by the POS devices in the retail system responsive to determining that the business rule template is valid, wherein activating the business rule template configures one or more client applications executing on the POS device to perform the one or more POS actions according to the decision logic in the business rule template and according to the date-based constraint and/or the time-based constraint.

11. The network computing device of claim 10 wherein the one or more POS actions comprise one or more of:
a manager override process;
a product return process;
a process that collects information about a product being purchased;
a validation process; and
an enforcement process configured to enforce one or more limitations associated with processes of the one or more POS actions.

12. The network computing device of claim 11 wherein the processing circuitry is further configured to execute the process that collects information about the product being purchased based on how the product is taxed.

13. The network computing device of claim 12 wherein the processing circuitry is further configured to execute the process that collects information about the product being purchased based on how a customer intends to use the product.

14. The network computing device of claim 11 wherein the retail context information comprises a user ID identifying a user associated with the retail business.

15. The network computing device of claim 11 wherein the retail context information comprises a store ID of the retail business.

16. The network computing device of claim 11 wherein the retail context information comprises a user permission set that defines the POS actions users associated with the retail business are permitted to perform.

17. The network computing device of claim 11 wherein the processing circuitry is further configured to store the business rule template in a memory responsive to determining that the business rule template is valid.

18. The network computing device of claim 11 wherein the processing circuitry is further configured to output a graphical user interface (GUI) to a user associated with the retail system, wherein the GUI is configured to receive rule data as user input.

19. A non-transitory computer-readable medium storing a computer program thereon, the computer program comprising instructions that, when executed by processing circuitry of a network computing device in a retail system, configures the network computing device to:
receive rule data from a graphical user interface (GUI), wherein the rule data comprises retail context information for a retail business associated with the retail system;
generate a business rule template based on the retail context information included in the rule data, wherein the business rule template is generated to comprise:
one or more business rules defining how a Point of Sale (POS) device in the retail system will function according to the retail context information;
a constraint to be applied by at least one of the one or more business rules, wherein the constraint comprises one or both of a date-based constraint and a time-based constraint; and
decision logic implementing the one or more business rules, wherein the decision logic comprises one or more conditional logic statements defining which of one or more POS actions the POS device will perform according to the date-based constraint and/or the time-based constraint
validate the business rule template based on the retail context information and on sample business data, wherein to validate the business rule template, the network computing device executes the decision logic in a non-production environment to selectively perform one or more POS actions according to the date-based constraint and/or the time-based constraint; and
activate the business rule template for use by the POS devices in the retail system responsive to determining that the business rule template is valid, wherein activating the business rule template configures one or more client applications executing on the POS device to perform the one or more POS actions according to the decision logic in the business rule template and according to the date-based constraint and/or the time-based constraint.

\* \* \* \* \*